(12) United States Patent
Park et al.

(10) Patent No.: US 10,286,911 B2
(45) Date of Patent: May 14, 2019

(54) CONTROL SYSTEM OF ENGINE AND TRANSMISSION AND CONTROL METHOD FOR THE SAME

(71) Applicants: HYUNDAI MOTOR COMPANY, Seoul (KR); KIA MOTORS CORPORATION, Seoul (KR)

(72) Inventors: Sangjun Park, Seoul (KR); Byeong Wook Jeon, Seoul (KR); Kwang Hee Park, Suwon-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 15/824,772

(22) Filed: Nov. 28, 2017

(65) Prior Publication Data

US 2019/0111929 A1    Apr. 18, 2019

(30) Foreign Application Priority Data

Oct. 16, 2017    (KR) .......................... 10-2017-0134049

(51) Int. Cl.
*B60W 10/06* (2006.01)
*B60W 10/10* (2012.01)
*B60W 30/18* (2012.01)

(52) U.S. Cl.
CPC ................ *B60W 30/18072* (2013.01); *B60W 2510/0638* (2013.01); *B60W 2510/1015* (2013.01); *B60W 2540/10* (2013.01)

(58) Field of Classification Search
CPC ................ B60W 10/06; B60W 10/10; B60W 30/18072; B60W 2540/10
See application file for complete search history.

(56) References Cited

U.S. PATENT DOCUMENTS

| 6,209,323 B1* | 4/2001 | Schmidt | B60W 10/06 180/197 |
| 2008/0183371 A1* | 7/2008 | Wolfgang | B60W 10/02 701/103 |

(Continued)

FOREIGN PATENT DOCUMENTS

| JP | 4787831 B2 | 10/2011 |
| KR | 10-0623746 B | 9/2006 |
| KR | 10-1684031 B | 12/2016 |

*Primary Examiner* — Edwin A Young
(74) *Attorney, Agent, or Firm* — Brinks Gilson & Lione

(57) ABSTRACT

The present disclosure provides a control method for an engine and a transmission. The control method may include: determining whether a current mode corresponds to a coasting mode; outputting a neutral operation signal to the transmission when the current mode corresponds to the coasting mode; determining whether an operation condition corresponds to a coasting mode release condition based on the signal of each sensor; outputting a D-stage connection signal to the transmission and outputting an engine torque limitation signal to the engine when the operation condition corresponds to the coasting mode release condition; determining whether the operation condition corresponds to a release of the engine torque limitation condition according to an entry of D stage and the signals of the engine RPM and turbine RPM; and outputting a normal operation signal to the engine when the operation condition corresponds to the release of the engine torque limitation condition.

7 Claims, 4 Drawing Sheets

(56) References Cited

U.S. PATENT DOCUMENTS

| | | | |
|---|---|---|---|
| 2011/0035135 A1* | 2/2011 | Schwalm | B60W 10/02 |
| | | | 701/110 |
| 2012/0135839 A1* | 5/2012 | Watanabe | B60W 30/18072 |
| | | | 477/110 |

* cited by examiner

FIG. 4

| ENGINE-TURBINE SLIP AMOUNT(RPM) | -100 | 0 | 10 | 20 |
|---|---|---|---|---|
| SHIFT CONTROL PHASE MAINTENANCE TIME(ms) | 200 | 50 | 20 | 0 |

CONTROL SYSTEM OF ENGINE AND TRANSMISSION AND CONTROL METHOD FOR THE SAME

CROSS-REFERENCE TO RELATED APPLICATION

The present application claims priority to and the benefit of Korean Patent Application No. 10-2017-0134049, filed on Oct. 16, 2017, which is incorporated herein by reference in its entirety.

FIELD

The present disclosure relates to a control system of an engine and a transmission and a control method for the same, and more particularly, to a control system of an engine and a transmission and a control method for the same in a tip-in mode during a coasting mode.

BACKGROUND

The statements in this section merely provide background information related to the present disclosure and may not constitute prior art.

When a vehicle is coast driving, an engine is controlled in a fuel cut state in which fuel injection is not performed and an automatic transmission is controlled so that the engine is not stalled through the deceleration direct connection of a damper clutch.

However, in this case, the engine serves as a load of the vehicle, and as a result, a coasting driving distance is reduced and when the engine is kept in the fuel cut state for a long period of time, a temperature of a catalyst is lowered and oxygen is adsorbed to the catalyst. Accordingly, there is an issue that the fuel must be injected richly in order to raise the catalyst temperature at an initial stage of re-acceleration of the engine, which generates NOx.

A coasting mode is a control method that shifts the automatic transmission to an N-stage state through shifting hydraulic control during the coast driving.

In the coasting mode, the engine and the vehicle are separated from each other because the transmission is in the N-stage state and the coast driving distance increases. Therefore, the number of times of stepping an accelerator may be reduced when the vehicle is driven on the same distance, thereby improving fuel efficiency of the vehicle.

In addition, since a frequency of entry of the engine into the fuel cut is reduced and the temperature of the catalyst is not lowered, NOx can be reduced when the engine is re-accelerated.

When an accelerator pedal is operated in an entering state of the coasting mode, the engine and the transmission connect to a D-stage again in order to accelerate the vehicle.

Generally, since an increase of engine torque speed is greater than a rise of transmission oil pressure speed, a D-stage connection hydraulic control signal is entered to the automatic transmission so that the torque-to-shift connection oil pressure shortage does not occur. At the same time, an engine torque limitation (ETL) signal is entered to the engine.

However, when a shift ends, a torque limit is released. As a result, the engine torque rises rapidly and an engine-turbine reversal in which the engine RPM is changed to a state that the engine RPM is greater than the turbine RPM may occur.

The above information disclosed in this section is only for enhancement of understanding of the background of the disclosure and therefore it may contain information that does not form the prior art that is already known in this country to a person of ordinary skill in the art.

SUMMARY

The present disclosure provides a control system of an engine and a transmission and a control method for the same which reduce engine-turbine reverse shock even though a shift event ends.

One form of the present disclosure provides control system of an engine and a transmission, including: an accelerator pedal sensor configured to output a signal of an accelerator pedal; an engine revolutions per minute (RPM) sensor configured to detect rotation of an engine and to output a signal of an engine RPM; a turbine RPM sensor configured to detect rotation of a transmission turbine and to output a signal of a turbine RPM; the engine; a transmission; and a controller configured to receive vehicle operation state information including the signals of the accelerator pedal, the engine RPM, and the turbine RPM and to control the engine and the transmission, wherein the controller is further configured to: output a D-stage connection signal to the transmission and output an engine torque limitation signal to the engine when a current condition corresponds to a tip-in condition by the signal of the accelerator pedal during a coasting mode of a vehicle; and to release the engine torque limitation signal when a D-stage is entered and the engine RPM is greater than the turbine RPM.

The controller may be configured to determine whether an operation condition of the vehicle corresponds to a coasting mode condition and when the operation condition of the vehicle corresponds to the coasting mode condition, the controller may be configured to output a neutral operation signal to the transmission.

The controller may be configured to lower a limitation slope of the engine torque limitation signal according to the turbine RPM.

The controller may be configured to detect slip amounts of the engine RPM and the turbine RPM and maintain a shift control phase time according to the slip amounts of the engine RPM and the turbine RPM.

Another form of the present disclosure provides a control method of an engine and a transmission, including an accelerator pedal sensor outputting an operating signal of an accelerator pedal, an engine RPM sensor detecting rotation of an engine and outputting the corresponding signal, a turbine RPM sensor detecting rotation of a transmission turbine and outputting the corresponding signal, the engine, a transmission, and a controller receiving vehicle operation state information including the signals of the accelerator pedal sensor, the engine RPM sensor, and the turbine RPM sensor and controlling operations of the engine and the transmission, including: determining, with the controller, whether a current mode corresponds to a coasting mode based on signals of sensors; outputting, with the controller, a neutral operation signal to the transmission when the current mode corresponds to the coasting mode; determining, with the controller, whether an operation condition of a vehicle corresponds to a coasting mode release based on the signals of the sensors; outputting, with the controller, a D-stage connection signal to the transmission and outputting an engine torque limitation signal to the engine when the operation condition of the vehicle corresponds to the coasting mode release condition; determining, with the controller, whether the operation condition of the vehicle corresponds to a release of the engine torque limitation condition according to an entry of D stage and the signals of the engine RPM and the turbine RPM; and outputting, with the controller, a normal operation signal to the engine when the operation condition of the vehicle corresponds to the release of the engine torque limitation condition.

The control method may further include: lowering, with the controller, a limitation slope of the engine torque limitation signal according to the turbine RPM.

The control method may further include: detecting slip amounts of the engine RPM and the turbine RPM and maintaining a shift control phase time according to the slip amounts of the engine RPM and the turbine RPM.

In some forms of the present disclosure, a control system of an engine and a transmission and a control method for the same can reduce engine-turbine reverse shock by controlling an engine torque limitation signal by considering an engine RPM and a turbine RPM at the time of tip-in during a coasting mode.

In some forms of the present disclosure, the control system of an engine and a transmission and the control method for the same can reduce shifting shock by inducing engine-turbine reverse to occur in a state where an engine torque increase speed is small by monitoring the turbine RPM.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 4 is a table showing slip amounts and a shift control phase time of an engine RPM and a turbine RPM by the control method of an engine and a transmission.

Figure 1:
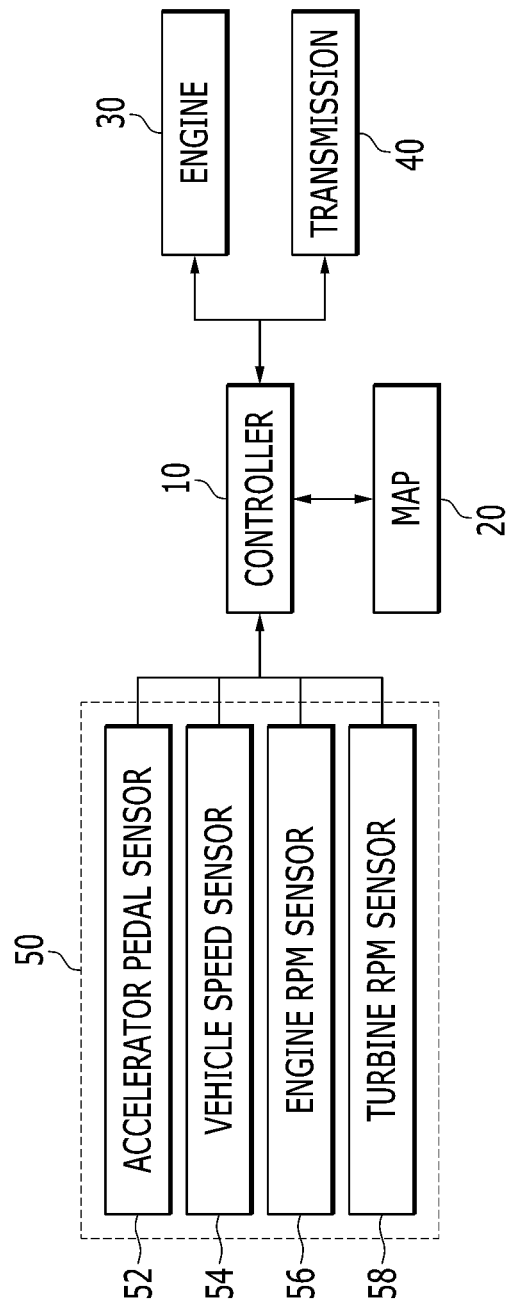
FIG. 1 is a block diagram of a control system of an engine and a transmission.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Throughout the specification, unless explicitly described to the contrary, the word "comprise" and variations such as "comprises" or "comprising", will be understood to imply the inclusion of stated elements but not the exclusion of any other elements.

Some forms of the present disclosure will hereinafter be described in detail with reference to the accompanying drawings.

FIG. 1 is a block diagram of a control system of an engine and a transmission in some forms of the present disclosure.

Referring to FIG. 1, the control system of an engine and a transmission in some forms of the present disclosure includes a vehicle operation state detecting unit 50, an engine 30, a transmission 40, and a controller 10 controlling operations of the engine 30 and the transmission 40 by receiving the vehicle operation state information.

The vehicle operation state detecting unit 50 includes an accelerator pedal sensor 52 outputting an operation signal of an accelerator pedal, a vehicle speed sensor 54 detecting a speed of a vehicle and outputting the corresponding signal, an engine RPM sensor 56 detecting rotation of the engine and outputting the corresponding signal, and a turbine RPM sensor 58 detecting the rotation of a transmission turbine and outputting the corresponding signal.

The controller 10 is configured to receive information such as a shift map, an engine torque limitation map, a shift control phase maintenance time, etc. for controlling the operations of the engine 30 and the transmission 40 from a preset map 20.

The controller 10 may be implemented as each of one or more microprocessors which operate by a predetermined program and the predetermined program may include a series of commands for performing a method in some forms of the present disclosure to be described below.

The controller 10 is a concept encompassing a control means for controlling the operations of the engine 30 and the transmission 40 such as a transmission control unit (TCU), etc.

Figure 2:
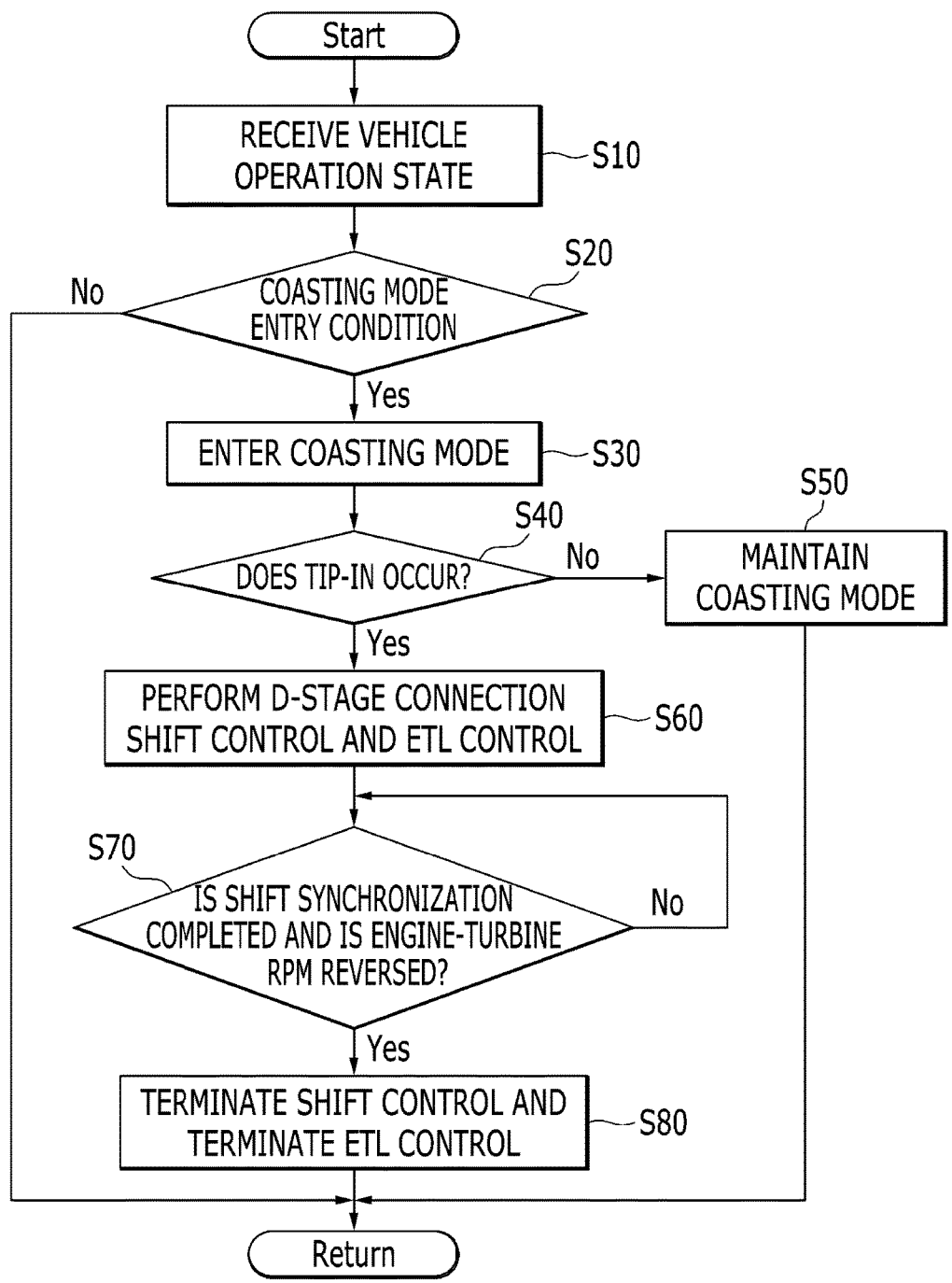
FIG. 2 is a flowchart of a control method of an engine and a transmission.
Figure 3:
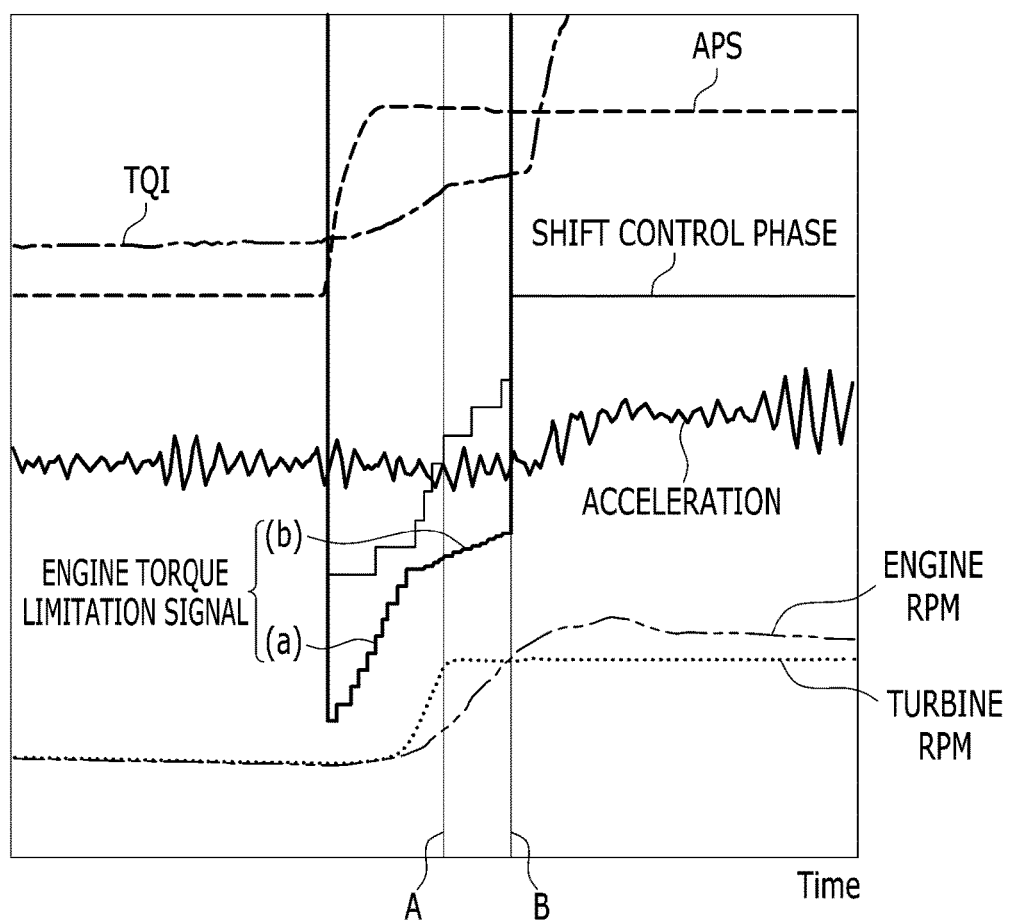
FIG. 3 is a graph showing a shifting process by the control method of an engine and a transmission.

FIG. 2 is a flowchart of a control method of an engine and a transmission in some forms of the present disclosure and FIG. 3 is a graph showing a shifting process by the control method of an engine and a transmission in some forms of the present disclosure.

The control method of an engine and a transmission in some forms of the present disclosure will be described with reference to FIGS. 1 to 3.

The controller 10 receives the vehicle operation state information of the vehicle operation state detecting unit 50 (S10) and determines whether a current mode corresponds to a coasting mode through output signals of the respective sensors 52, 54, 56, and 58 (S20).

For example, the controller 10 compares output values of the accelerator pedal sensor 52, the vehicle speed sensor 54, the engine RPM sensor 56, the turbine RPM sensor 58 and the torque sensor 60 with a coasting mode condition value stored in the map 20 (S20) and when an entry condition corresponds to a coasting mode condition, the controller 10 controls the operations of the engine 30 and the transmission 40 to enter the coasting mode (S30).

For example, when the output value of the accelerator pedal sensor 52 is 0 or equal to or smaller than a set value and the output value of the vehicle speed sensor 54 is equal to or larger than the set value, the controller 10 controls the operation of the engine 30 in an idle state and maintains the operation of the transmission 40 in a neutral (N) state.

The controller 10 outputs a neutral operation signal to the transmission 40 (S30) and when the coasting mode operates, the controller 10 determines whether the current condition corresponds to a coasting mode release condition (or a coasting mode release condition) through the output signals of the respective sensors 52, 54, 56, and 58 (S40).

For example, when the output value of the accelerator pedal sensor 52 is generated, that is, tip-in occurs, the controller 10 determines that the current condition corresponds to the coasting mode release condition, outputs a D-stage connection signal to the transmission 40, and outputs an engine torque limitation (ETL) signal to the engine 30 (S60).

For example, the engine torque limitation signal as a signal for controlling a fuel injection amount, a throttle opening degree, a valve lift, a valve timing, an ignition time, and the like may be implemented in various types of control methods for limiting output torque of the engine 30.

When the output value of the accelerator pedal sensor 52 is not generated, the controller 10 maintains the coasting mode (S50).

The controller 10 determines whether the current condition corresponds to the engine torque limitation (ETL) cancellation condition (or the engine torque limitation (ETL) release condition) according to the completion of the D-stage connection of the transmission and the engine RPM and the turbine RPM signal (S70) and when the current condition corresponds to the engine torque limitation (ETL) cancellation condition, the controller 10 outputs a normal operation signal to the engine 30 (S80). That is, when the D-stage connection of the transmission is completed and the engine RPM is larger than the turbine RPM, the controller 10 may cancel or release the engine torque limitation (ETL) signal.

Referring to FIG. 3, when the output value APS of the accelerator pedal sensor 52 is generated, that is, the tip-in occurs, the controller 10 outputs the engine torque limitation (ETL) signal to the engine 30 and monitors the engine RPM and the turbine RPM.

At the same time, the controller 10 controls the operation of the transmission 40 according to the vehicle operation state information of the vehicle operation state detecting unit 50 including the accelerator pedal sensor 52 and the vehicle speed sensor 54 and a shift stage such as a third stage, a fifth stage, or the like.

The controller 10 determines whether the shift of the transmission 40 is completed (A) and the engine RPM reverses the turbine RPM (B) to cancel or release the engine torque limitation (ETL) of the engine 30. That is, the engine torque limitation (ETL) is cancelled after occurrence of an engine-turbine reverse phenomenon.

By the control system of an engine and a transmission and the control method for the same in some forms of the present disclosure, it may be possible to reduce the engine-turbine reversal in which the engine RPM is changed from a state in which the engine RPM is lower than the turbine RPM to a state in which the engine RPM is higher than the turbine RPM due to the cancellation of the engine torque limitation (ETL) after the shift is changed and the resulting engine-turbine reverse shock. That is, the engine-turbine reverse shock may be reduced by canceling or releasing the engine torque limitation signal by considering the engine RPM and the turbine RPM at the time of the tip-in during the coasting mode.

The controller 10 may lower a limitation slope of the engine torque limitation signal to the engine control unit according to the turbine RPM.

That is, as illustrated in FIG. 3, the controller 10 monitors the turbine RPM to detect current shift progress rate and when the turbine RPM is equal to or larger than to a preset value according to the predetermined shift progress rate, the limitation slope (a→b) for the engine torque limitation signal may be lowered.

When the limitation slope of the engine torque limitation signal is lowered, the rising speed of the engine RPM may be lowered, and as a result, the engine-turbine reverse may occur in a state where the engine torque rising speed is low.

The engine-turbine reverse occurs when the engine torque rising speed is low, and as a result, the engine-turbine reverse shock may be reduced.

TQI of FIG. 3 represents output torque.

FIG. 4 is a table showing slip amounts and a shift control phase time of an engine RPM and a turbine RPM by the control method of an engine and a transmission in some forms of the present disclosure.

Referring to FIGS. 3 and 4, the controller 10 may detect slip amounts of the engine RPM and the turbine RPM and maintain the shift control phase time according to the slip amounts.

For example, it may be possible to reduce frequent control signal changes by maintaining a current control state according to the slip amount and to cancel the engine torque limitation (ETL) after occurrence of the engine-turbine reversal.

The description of the disclosure is merely exemplary in nature and, thus, variations that do not depart from the substance of the disclosure are intended to be within the scope of the disclosure. Such variations are not to be regarded as a departure from the spirit and scope of the disclosure.

| <Description of symbols> | |
|---|---|
| 10: Controller | 20: Map |
| 30: Engine | 40: Transmission |
| 50: Vehicle operation state detecting unit | |
| 52: Accelerator pedal sensor | |
| 54: Vehicle speed sensor | 56: Engine RPM sensor |
| 58: Turbine RPM sensor | 60: Torque sensor |

What is claimed is:

1. A control system of an engine and a transmission, the control system comprising:
    an accelerator pedal sensor configured to output a signal of an accelerator pedal;
    an engine revolutions per minute (RPM) sensor configured to detect rotation of an engine and to output a signal of an engine RPM;
    a turbine RPM sensor configured to detect rotation of a transmission turbine and to output a signal of a turbine RPM;
    the engine;
    a transmission; and
    a controller configured to receive vehicle operation state information including the signals of the accelerator pedal, the engine RPM, and the turbine RPM and to control the engine and the transmission,
    wherein the controller is further configured to:
        output a D-stage connection signal to the transmission and output an engine torque limitation signal to the engine when a current condition corresponds to a tip-in condition by the signal of the accelerator pedal during a coasting mode of a vehicle; and
        release the engine torque limitation signal when a D-stage is entered and the engine RPM is greater than the turbine RPM.

2. The control system of claim 1, wherein the controller is configured to:
    determine whether an operation condition of the vehicle corresponds to a coasting mode condition; and
    output a neutral operation signal to the transmission when the operation condition of the vehicle corresponds to the coasting mode condition.

3. The control system of claim 1, wherein the controller is configured to:
lower a limitation slope of the engine torque limitation signal according to the turbine RPM.

4. The control system of claim 1, wherein the controller is configured to:
detect slip amounts of the engine RPM and the turbine RPM; and
maintain a shift control phase time according to the slip amounts of the engine RPM and the turbine RPM.

5. A control method of an engine and a transmission, the control method comprising:
determining, with a controller, whether a current mode corresponds to a coasting mode based on signals of sensors, wherein the sensors comprise an accelerator pedal sensor, an engine RPM sensor, and a turbine RPM sensor;
when the current mode corresponds to the coasting mode, outputting, with the controller, a neutral operation signal to the transmission;
determining, with the controller, whether an operation condition of a vehicle corresponds to a coasting mode release condition based on the signals of the sensors;
outputting, with the controller, a D-stage connection signal to the transmission and outputting an engine torque limitation signal to the engine when the operation condition of the vehicle corresponds to the coasting mode release condition;
determining, with the controller, whether the operation condition of the vehicle corresponds to a release of the engine torque limitation condition according to an entry of D stage and the signals of the engine RPM and the turbine RPM; and
outputting, with the controller, a normal operation signal to the engine when the operation condition of the vehicle corresponds to the release of the engine torque limitation condition,
wherein the accelerator pedal sensor is configured to output the signal of the accelerator pedal,
wherein the engine RPM sensor is configured to detect rotation of an engine and to output the signal of the engine RPM,
wherein the turbine RPM sensor is configured to detect rotation of a transmission turbine and to out put the signal of the turbine RPM, and
wherein the controller is configured to receive vehicle operation state information including the signals of the sensors and to control the engine and the transmission.

6. The control method of claim 5, wherein the control method further comprises:
lowering, with the controller, a limitation slope of the engine torque limitation signal according to the turbine RPM.

7. The control method of claim 5, wherein the control method further comprises:
detecting slip amounts of the engine RPM and the turbine RPM; and
maintaining a shift control phase time according to the slip amounts of the engine RPM and the turbine RPM.

* * * * *